US007778966B2

(12) United States Patent
Balassanian

(10) Patent No.: US 7,778,966 B2
(45) Date of Patent: Aug. 17, 2010

(54) METHOD AND SYSTEM FOR ATTRIBUTE MANAGEMENT IN A NAMESPACE

(75) Inventor: Edward Balassanian, Seattle, WA (US)

(73) Assignee: Implicit Networks, Inc., Kirkland, WA (US)

( * ) Notice: Subject to any disclaimer, the term of this patent is extended or adjusted under 35 U.S.C. 154(b) by 530 days.

(21) Appl. No.: 11/589,397

(22) Filed: Aug. 9, 2006

(65) Prior Publication Data

US 2007/0260630 A1 Nov. 8, 2007

Related U.S. Application Data

(63) Continuation of application No. 10/323,874, filed on Dec. 18, 2002, now abandoned.

(60) Provisional application No. 60/341,932, filed on Dec. 18, 2001.

(51) Int. Cl.
*G06F 17/30* (2006.01)
(52) U.S. Cl. .................................................. 707/610
(58) Field of Classification Search .................. 707/10, 707/3, 101; 719/313, 328
See application file for complete search history.

(56) References Cited

U.S. PATENT DOCUMENTS 5,465,365 A * 11/1995 Winterbottom ............. 707/101
5,483,652 A * 1/1996 Sudama et al. ............... 707/10
5,689,701 A * 11/1997 Ault et al. ..................... 707/10
6,061,743 A * 5/2000 Thatcher et al. ............. 719/328
6,895,586 B1 * 5/2005 Brasher et al. .............. 719/313
2002/0073080 A1* 6/2002 Lipkin ............................ 707/3
2003/0101434 A1* 5/2003 Szyperski ................... 717/120

OTHER PUBLICATIONS

USPTO Office Action, U.S. Appl. No. 10/323,874 Mailed on Jun. 3, 2005.*
USPTO Office Action, U.S. Appl. No. 10/323,874 Mailed on Feb. 10, 2006.*

* cited by examiner

*Primary Examiner*—Don Wong
*Assistant Examiner*—Sheree N Brown
(74) *Attorney, Agent, or Firm*—Gard & Kaslow LLP

(57) ABSTRACT

A computer-based method and system for managing attributes of objects in a namespace and for allowing multiple views into the namespace. The namespace system allows the objects identified by the names of the namespace to be hierarchically organized. The namespace system allows for attributes of various objects, including directory objects and data objects, to be dynamically defined after creation of an object. The namespace system also allows for the querying of objects based on their dynamically defined attributes. When the namespace system receives a query specification that includes a newly defined attribute, it identifies the objects that match that query specification that includes a newly defined attribute, it identifies the objects that match that query specification.

5 Claims, 13 Drawing Sheets set(name, object)

get(name, object)

getchildren(namelist)

setattribute(name, value)

getattribute(name, value)

getattributes(namelist)

query(criterion, objectlist)

filter(criterion, view, object)

getinterfaces(interfacelist)

getdata

METHOD AND SYSTEM FOR ATTRIBUTE MANAGEMENT IN A NAMESPACE

CROSS-REFERENCE TO RELATED APPLICATION

This application is a continuation of U.S. Utility application Ser. No. 10/323,874 filed Dec. 18, 2002 now abandoned which claims the benefit of U.S. Provisional Application No. 60/341,932 filed Dec. 18, 2001, both of which are incorporated herein by reference in their entirety.

FIELD OF THE INVENTION

The described technology relates generally to namespaces and particularly to managing of attributes for objects within a namespace.

BACKGROUND OF THE INVENTION

A namespace is a collection of names that each uniquely identifies an object. For example, the pathnames of a conventional file system uniquely identify the files of the file system and are thus a namespace for the file system. Namespaces, however, can contain the names of a wide variety of objects including files, computer input and output devices, users, and so on. A namespace service typically provides various functions through which applications and users can access the information of the namespace. For example, a namespace may provide a function to retrieve a reference to an object having a specified name. When the function is invoked, it accesses various data structures to locate the object and return its reference.

The difficulty with namespaces is that they typically have predefined attributes associated with their objects. As such, applications and application developers are constrained by the attributes defined by the namespace developers. In addition, namespaces typically provide a logical view of their objects that corresponds to the physical organization of the namespace. For example, if the namespace is hierarchically organized, then the only view of that namespace reflects that same hierarchical organization. It would be desirable to have a namespace service that would allow for more flexible handling of attributes and would allow for more flexible views into the namespace.

BRIEF DESCRIPTION OF THE DRAWINGS

Preferred and alternative embodiments of the present invention are described in detail below with reference to the following drawings:

FIG. 2 lists methods of the namespace interface in one embodiment.

DETAILED DESCRIPTION OF THE PREFERRED EMBODIMENT

Figure 1:
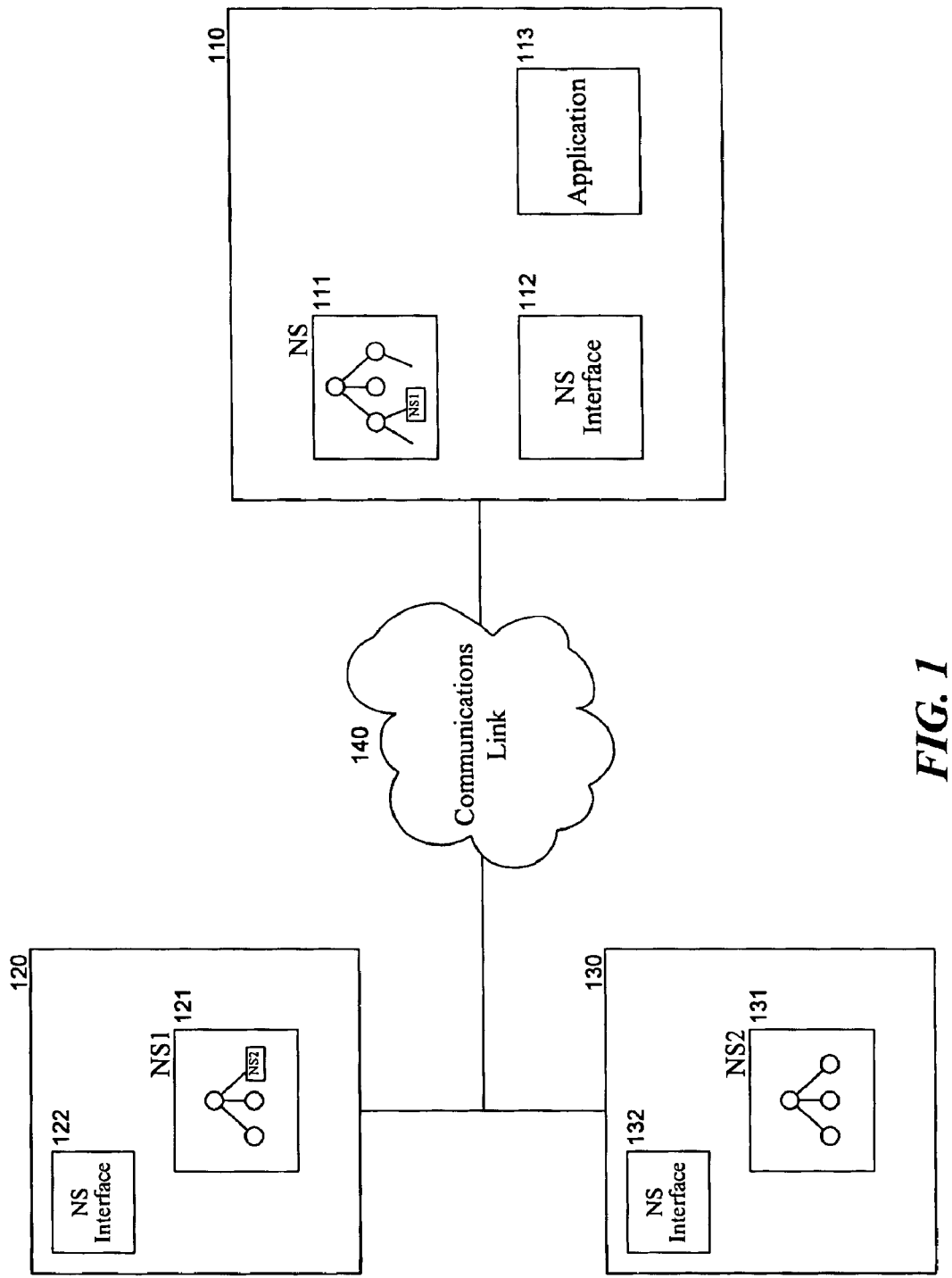
FIG. 1 is a block diagram illustrating components of the namespace system in one embodiment.

A computer-based method and system for managing attributes of objects in a namespace and for allowing multiple views into the namespace is provided. In one embodiment, the namespace system allows the objects identified by the names of the namespace to be hierarchically organized. One skilled in the art would appreciate that the namespace of the namespace system need not be hierarchical. For example, the namespace could be flat. The namespace system allows for attributes of various objects, including directory objects and data objects, to be dynamically defined after creation of an object. For example, an object representing a video may have the predefined attributes of format type and length. The namespace system allows for an additional attribute, such as title, to be dynamically added to the object. The namespace system may define a namespace interface (e.g., a collection of methods or functions) that each object identified by the namespace implements. The namespace interface may include a function for defining new attributes and setting the values of those attributes. The namespace system also allows for the querying of objects based on their dynamically defined attributes. When the namespace system receives a query specification that includes a newly defined attribute, it identifies the objects that match that query specification. In this way, the namespace system allows for flexible customization of the information or metadata associated with the objects of a namespace.

In another embodiment, the namespace system generates different views of portions of a namespace based on a query specification and a view specification. The query specification specifies the criteria for the objects that are to be included in the view. The query specification may use any conventional querying language, such as an SQL-type language. The query specification may specify attribute names and the values for the objects that match the query specification. The view specification specifies how the objects that match the query specification are to be organized when they are returned. The objects may be organized hierarchically based on values of certain attributes. For example, a query specification may indicate to retrieve objects whose data type is "video." The view specification may specify to organize those objects hierarchically by their genre and then by the director within each genre. The genre and director may be attributes of the video objects. In such a case, the view specification may be "genre/director." More generally, the view specification may specify a hierarchy of attribute names and attribute values defining the organization of the objects.

In another embodiment, the namespace system allows for caching of attribute names and values so that objects that are stored remotely can have their attributes accessed without the need to access the remote storage each time. When an attribute of an object is initially accessed, the namespace system accesses the remote storage to retrieve the attributes (e.g., metadata) of the object. The namespace system then stores the attribute names and values locally. When the attributes are next accessed, the namespace system need only access the local storage. By caching the attribute names and values, the namespace system can reduce the number of remote accesses.

In another embodiment, the namespace system allows for the duplication of objects so that they can be accessed when a computer system is off-line. For example, a user may want to store a duplicate portion of the namespace relating to customer addresses on a personal digital assistant ("PDA"). The namespace system allows the user to specify a query specification and a view specification for the duplicate portion of the namespace. The namespace system then identifies the objects that match that query specification, generates a hierarchical organization of those objects using the view specification, and makes a copy of that hierarchical organization as a duplicated namespace for use off-line. After the duplicate namespace is created, a user may change the objects of either the duplicate or original namespace. In such case, the namespace may be out of synchronization. Eventually, the user may want to synchronize the namespaces. To synchronize the namespaces, the namespace system may rerun the query specification against the original namespace, as modified. The namespace system may then compare the objects returned by the query to the objects of the duplicate namespace. The namespace system can then resolve any differences by updating the original namespace or the duplicate namespace as appropriate.

FIG. 1 is a block diagram illustrating components of the namespace system in one embodiment. The computer system 110 is connected to computer system 120 and computer system 130 via communications link 140. Computer system 110 includes the root of the namespace 111, a namespace interface 112, and an application program 113. Namespace 111 may include directory objects and data objects. The directory objects specify the hierarchical organization of the namespace, and the data objects correspond to the leaf nodes or data identified by the namespace of the namespace. In this example, the namespace 111 includes a reference to namespace 121 defined on computer system 120. In particular, namespace 111 contains the reference "NS1," which identifies the namespace 121. Namespace 121 is thus a sub-namespace of namespace 111. Namespace 121 includes a reference to namespace 131 of computer system 130. Namespaces 111, 121, and 131 form a distributed namespace. The namespace interfaces 112, 122, and 132 provide various functions associated with each object, directory or data, of the namespace. As the objects of the namespace are accessed, in-memory objects may be instantiated to represent each namespace object. Each in-memory objects may implement a namespace interface that provides methods or functions for accessing the object. Wrappers implementing the namespace interface may be used to encapsulate in-memory objects, file system objects, database objects, devices, and so on that are part of the namespace.

The computer systems and servers of the namespace system may include a central processing unit, memory, input devices (e.g., keyboard and pointing devices), output devices (e.g., display devices), and storage devices (e.g., disk drives). The memory and storage devices are computer-readable media that may contain instructions that implement the namespace system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 2 lists methods of the namespace interface in one embodiment. The namespace interface defines a set method for adding objects, directory or data, to the namespace. The set method is passed a unique name for the object along with a reference to the object, which may be a reference to the namespace interface of the object. The name of an object may be represented as a hierarchical pathname similar to path names used for files, any of which may be relative to this object. The term "this object" refers to the object for which the method is invoked. The set method can be used to add a sub-namespace to another namespace, such as adding sub-namespace 121 to namespace 111. The namespace interface includes a get method for retrieving a reference to an object of a specified name. The namespace interface includes a get children method that returns a list of the names of the child objects of this object. The namespace interface includes a set attribute method which is passed an attribute name and value. The method sets the attribute with that name to that value. If no attribute with that name exists for this object, then the method creates a new attribute with that name and sets its value. The attribute name for an object may be hierarchically organized. The namespace interface includes a get attribute method that retrieves the value of the named attribute. The namespace interface includes a get attributes method that retrieves a list of the names of the attributes of the object. The namespace interface includes a query method that is passed a query specification and returns a list of objects of the namespace rooted at this object that match the query specification. The namespace interface includes a filter method that is passed a query specification and a view specification and returns a reference to an object that is the root of a view namespace that represents that query and view. The namespace interface includes a get interfaces method that retrieves a list of interfaces implemented by this object. The namespace interface includes a get data object that returns the data (e.g., video) associated with this object.

Figure 3:
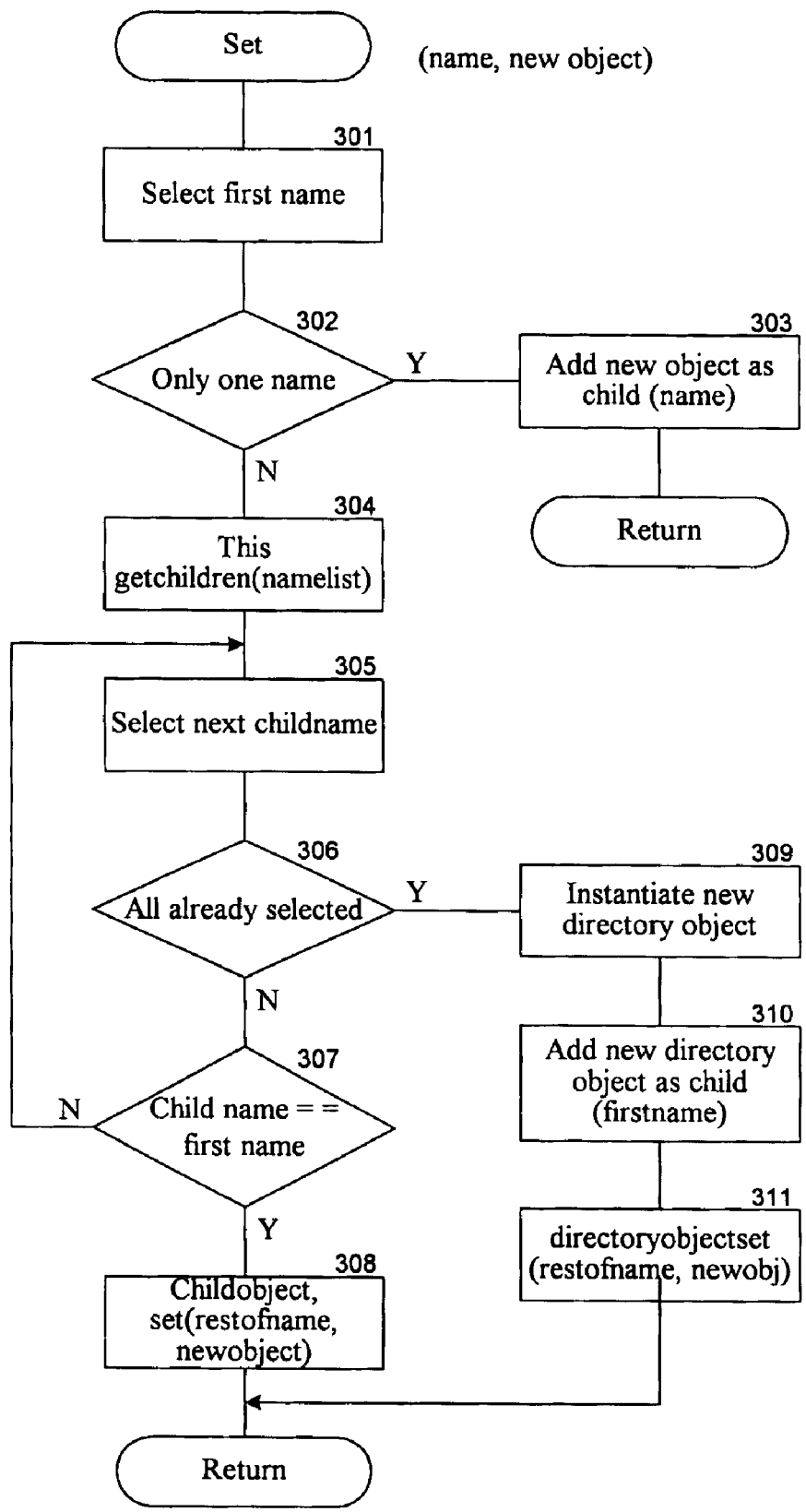
FIG. 3 is a flow diagram illustrating the processing of a set method of the namespace interface in one embodiment.

FIG. 3 is a flow diagram illustrating the processing of a set method of the namespace interface in one embodiment. The set method is passed the name of an object relative to this object and is passed the new object to be added to the namespace. In block 301, the method selects the first name of the passed name. If the name is specified as a sequence of names separated by slashes, then the method retrieves the name before the first slash. In decision block 302, if there is only one name in the passed name, then the method is at the place in the namespace at which to add the object and continues at block 303, else the method continues at block 304. In block 303, the method adds the new object as a child of this object and then returns. In block 304, the method retrieves a list of the names of the child objects of this object. In blocks 305-307, the method loops searching for a child object whose name matches the first name. In block 305, the method selects the next child name. In decision block 306, if all the child names have already been selected, then the method adds a new directory to create a path for the new object and continues at block 309, else the method continues at block 307. In decision block 307, if the name of the child object matches the first name, then the method continues at block 308, else the method loops to block 305 to select the next child name. In block 308, the method invokes the set method of the child object passing the rest of the name (excepting the first name) and passing the new object. The method then returns. In block 309, the method creates a new directory object. In block 310, the method adds the new directory object as a child of this object specifying that its name is the first name. In block 311, the method invokes the set method of the directory objects passing the rest of the name along with the new object and then returns.

Figure 4:
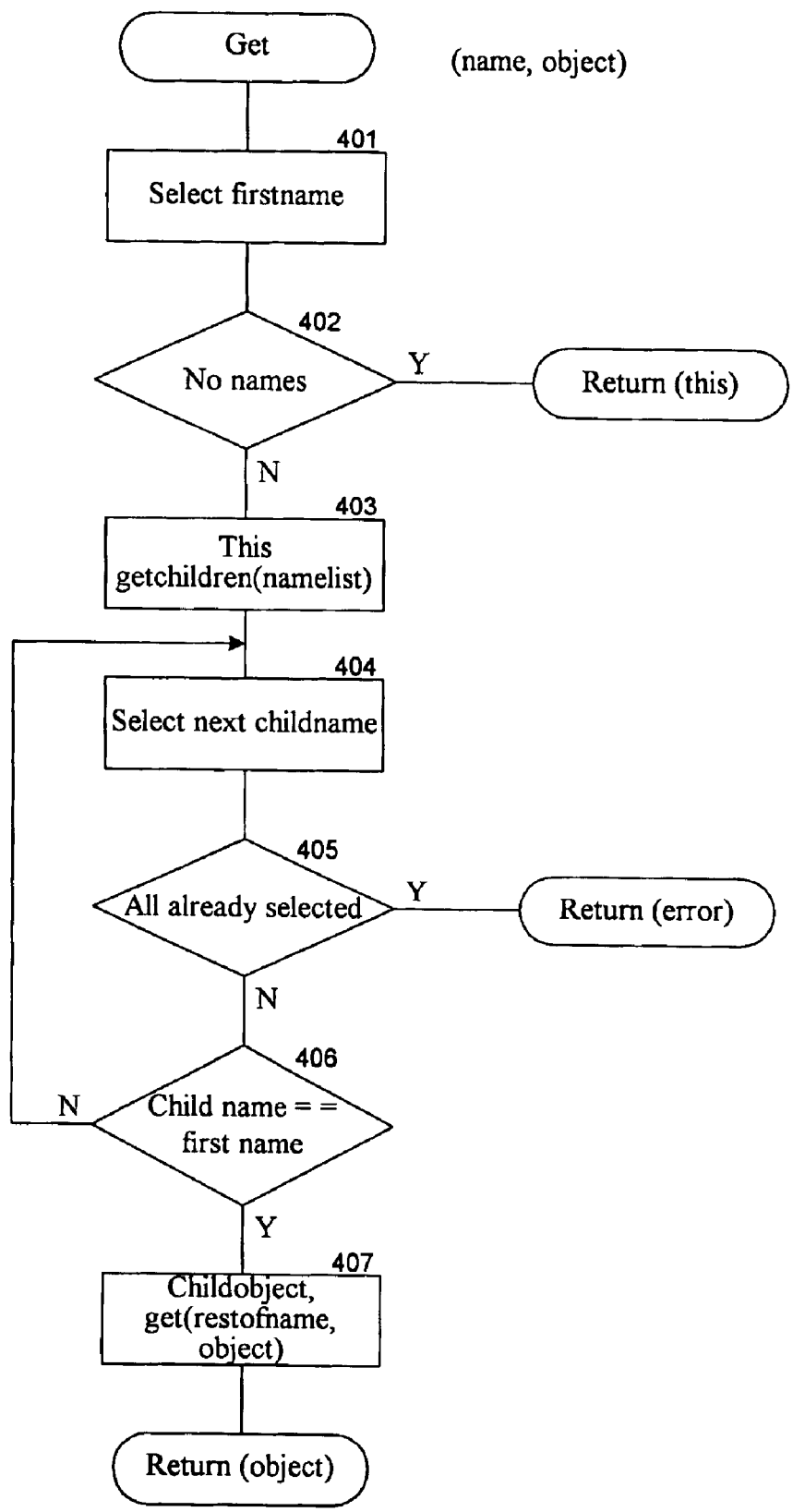
FIG. 4 is a flow diagram illustrating processing of the get method of the namespace interface in one embodiment.

FIG. 4 is a flow diagram illustrating processing of a get method of the namespace interface in one embodiment. The get method is passed the name of an object relative to this object and returns a reference to that named object. In block 401, the method selects the first name of the passed name. In decision block 402, if there are no more names in the passed name, then the method has found the object and returns this object, else the method continues at block 403. In block 403, the method invokes the get children method of this object to retrieve the names of the child objects. In block 404-406, the method loops searching for the child object with the name that matches the first name. In block 404, the method selects the next name of a child object. In decision block 405, if all the names have already been selected, then the method returns an error because no object of that name has been found, else the method continues at block 406. In decision block 406, if the selected child matches the first name, then the method continues at block 407, else the method loops to block 404 to select the next child name. In block 407, the method invokes the get method of the child object passing the rest of the name and receiving a reference to the object in return. The method then returns the object.

Figure 5:
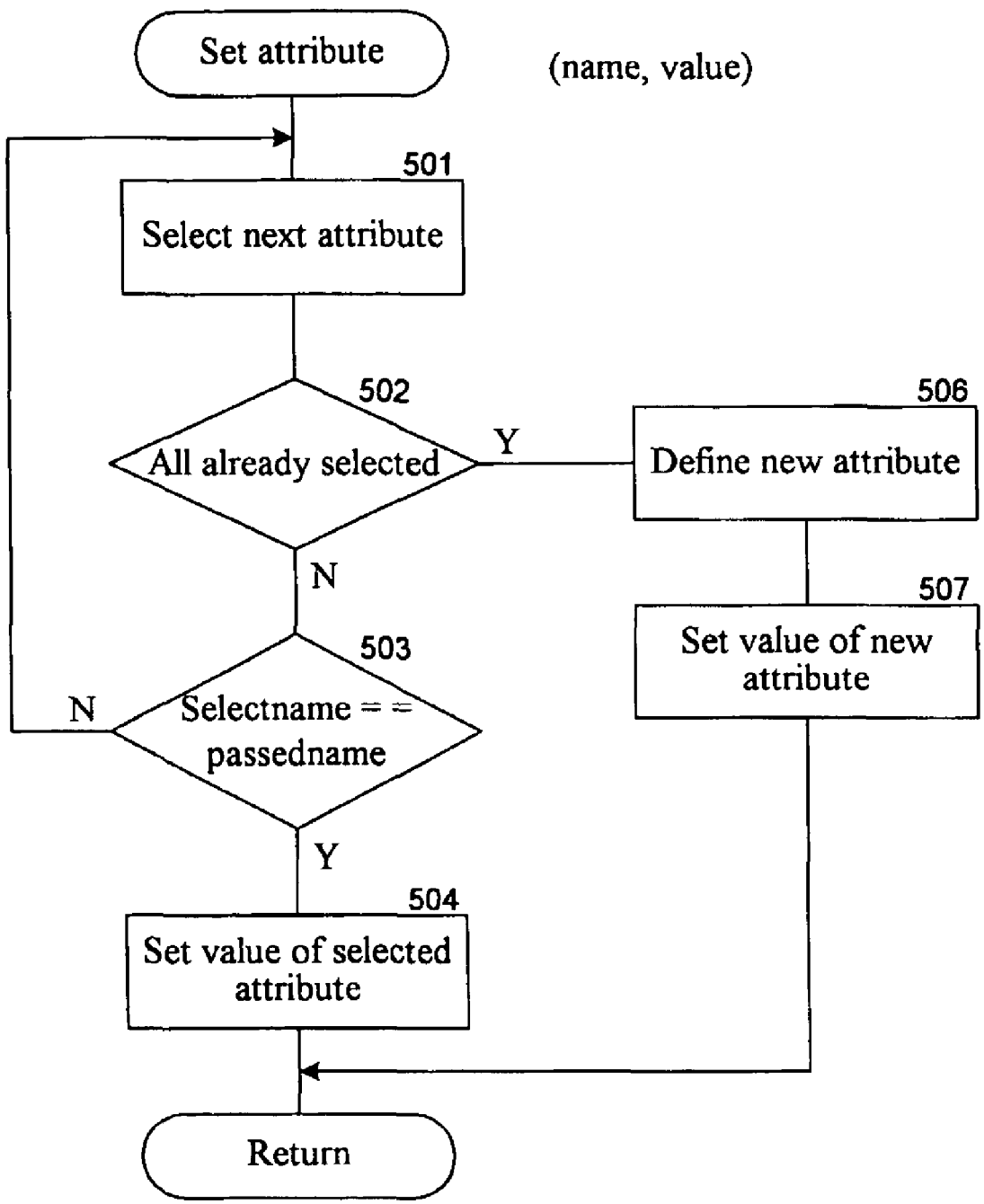
FIG. 5 is a flow diagram illustrating the processing of a set attribute method of the namespace interface in one embodiment.

FIG. 5 is a flow diagram illustrating the processing of a set attribute method of the namespace interface in one embodiment. The set attribute method is passed the name of an attribute and its value. In blocks 501-503, the method searches for an attribute of this object with the passed name. In block 504, the method selects the next attribute. In decision block 502, if all the attributes have already been selected, then the method continues at block 506, else the method continues at block 503. In decision block 503, if the name of the selected attribute equals the passed name, then the method continues at block 504, else the method loops to block 501 to select the next attribute. In block 504, the method sets the value of the selected attribute to the passed name and then returns. In block 506, the method defines a new attribute with the passed name for this object. In block 507, the method sets the value of the new attribute to the passed value and then returns.

Figure 6:
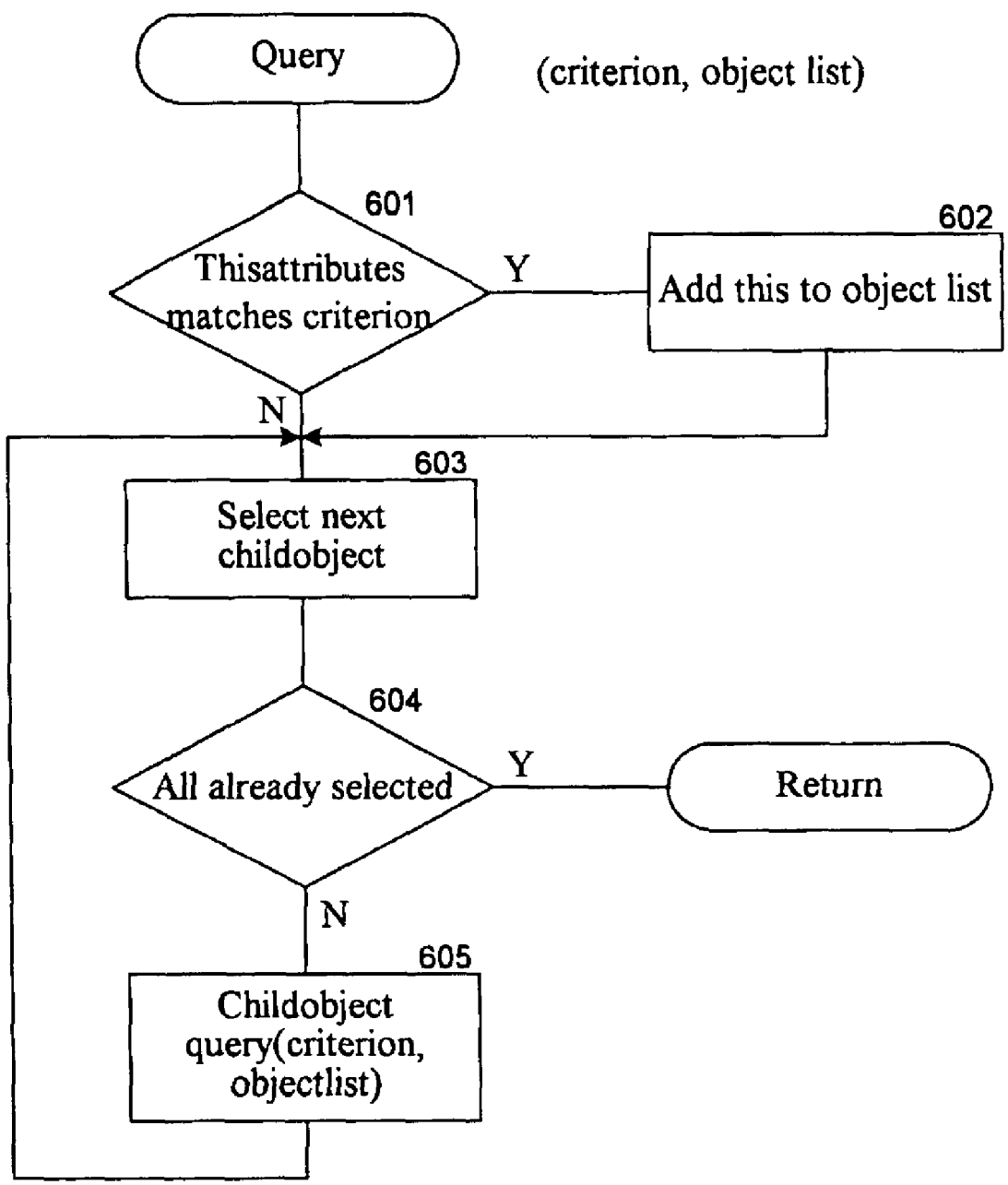
FIG. 6 is a flow diagram illustrating the processing of a query method of the namespace interface in one embodiment.

FIG. 6 is a flow diagram illustrating the processing of a query method of the namespace interface in one embodiment. The query method is passed a query specification (or criteria) and returns a list of object references that match the query specification. This object is the root of the namespace that is searched. In decision block 601, if the attributes of this object match the query specification, then the method continues at block 602, else the method continues at block 603. In block 602, the method adds a reference to this object to the object list and continues at block 603. In an alternate embodiment, the method only adds data objects or leaf objects to the object list. In block 603, the method selects the next child object of this object. In decision block 604, if all the child objects have already been selected, then the method returns, else the method continues at block 605. In block 605, the method invokes the query method of the selected child object passing the query specification and the object list. The method then loops to block 603 to select the next child object.

Figure 7:
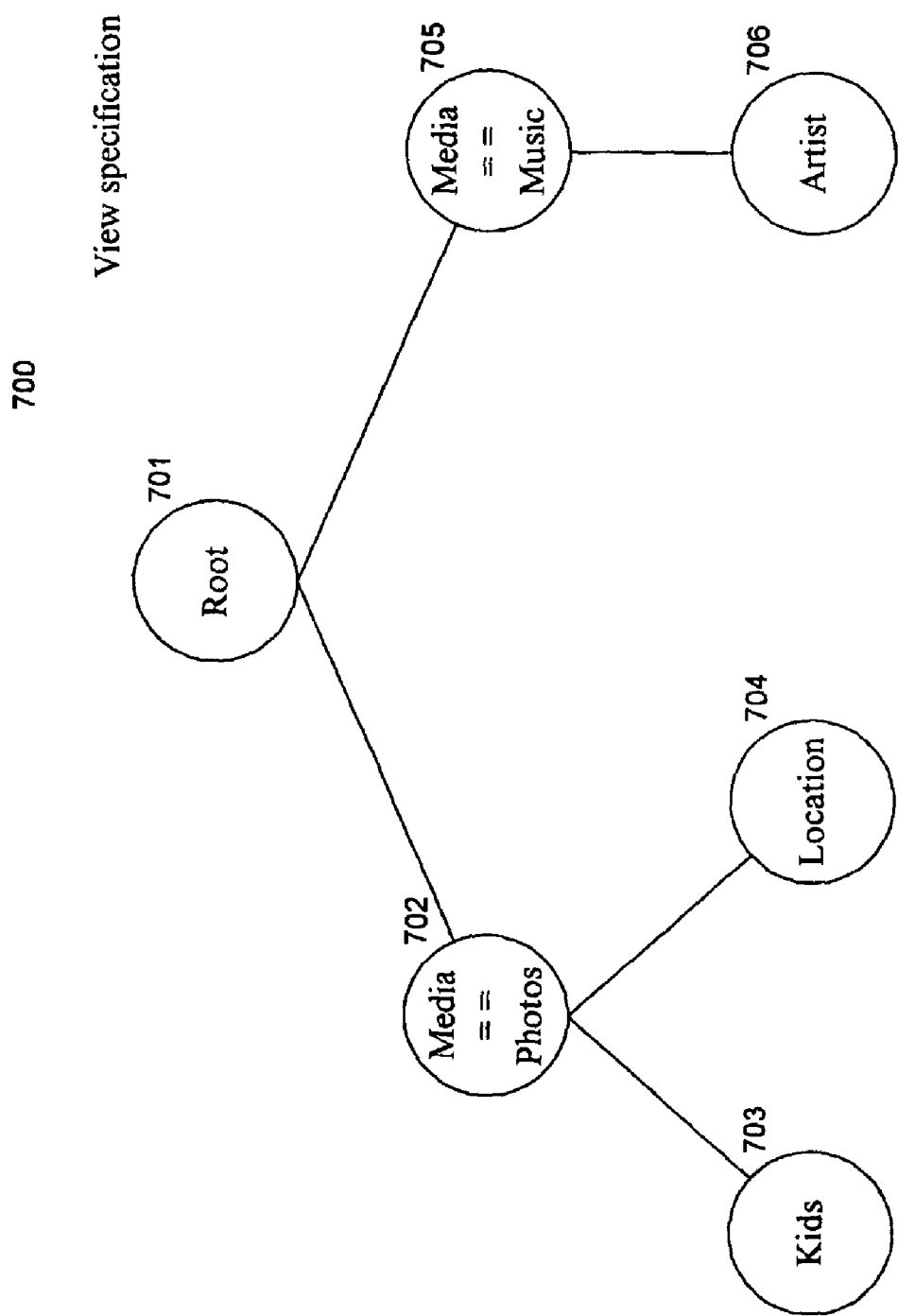
FIG. 7 is a block diagram illustrating a definition of a view specification in one embodiment.

FIG. 7 is a block diagram illustrating a definition of a view specification in one embodiment. In this example, view specification 700 includes a root node 701 that has child nodes 702 and 705. Child node 705 has child nodes 703 and 704. Node 705 has child node 706. Node 702 indicates that all objects whose media attribute has a value of "photos" are to be organized in one branch of the view. Those objects are further to be organized based on the kids attribute (e.g., kids shown in each photo) and location attribute (e.g., location of a vacation). Node 705 indicates that the objects with a value of "music" for their media attributes are to be organized down a separate branch of the view namespace. Node 706 indicates that the music objects are to be further organized according to their artist. One skilled in the art will appreciate that views can be specified in various different ways and to be arbitrarily complex.

Figure 8:
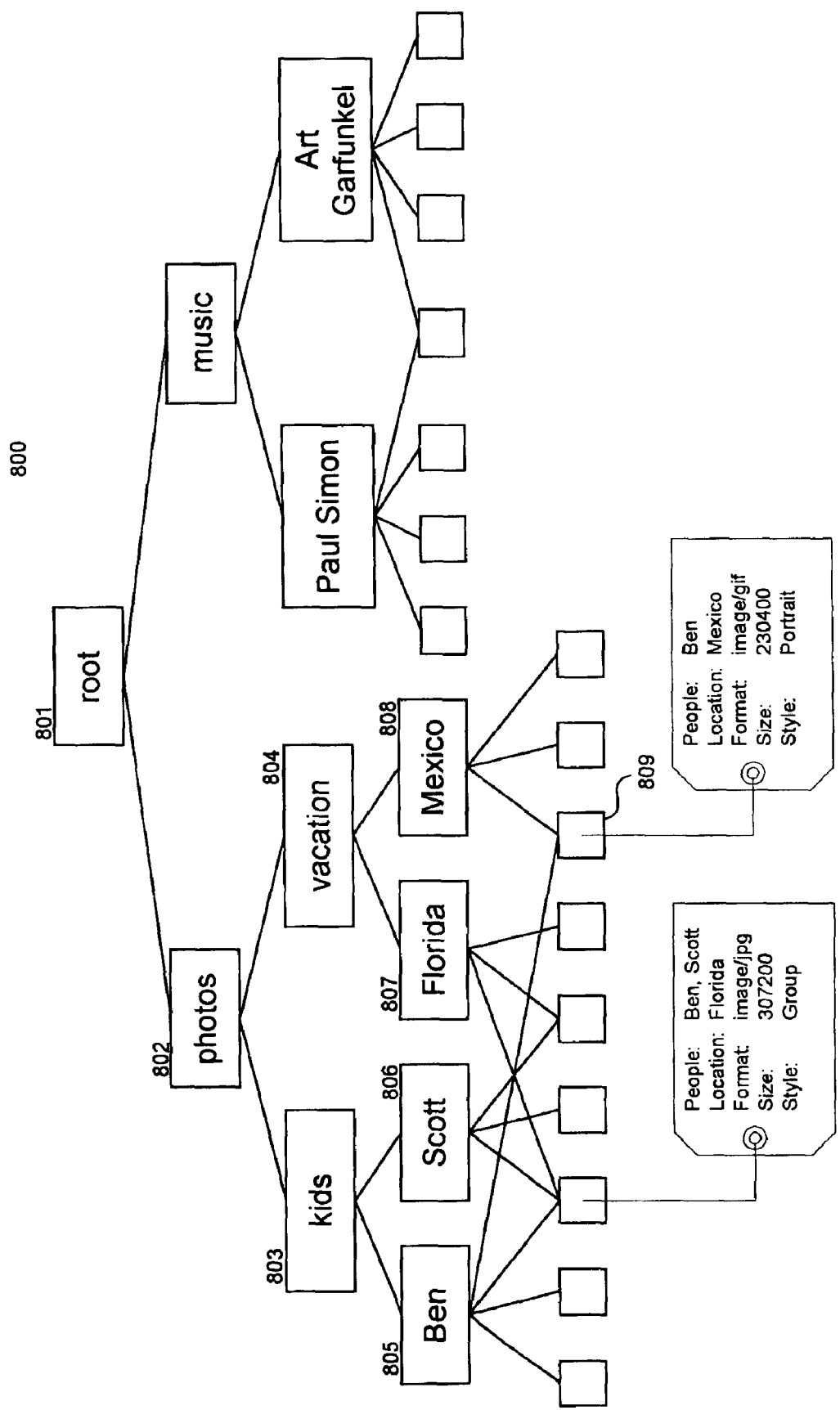
FIG. 8 is a block diagram illustrating a view generated by the view specification of FIG. 7 in one embodiment.

FIG. 8 is a block diagram illustrating a view generated by the view specification of FIG. 7 in one embodiment. View 100 includes root directory object 801. Child object 802 identifies the objects whose media type equals "photos." Directory objects 803, 805, and 806 organize the objects according to the kids in the photos. Directory objects 804, 807, and 808 organize the objects according to location of vacation. As illustrated by the leaf objects, various objects can be accessed via multiple paths of the view hierarchy. For example, leaf object 809 can be accessed via path "photos/kids/Ben" and via path "photos/vacation/Mexico."

Figure 9:
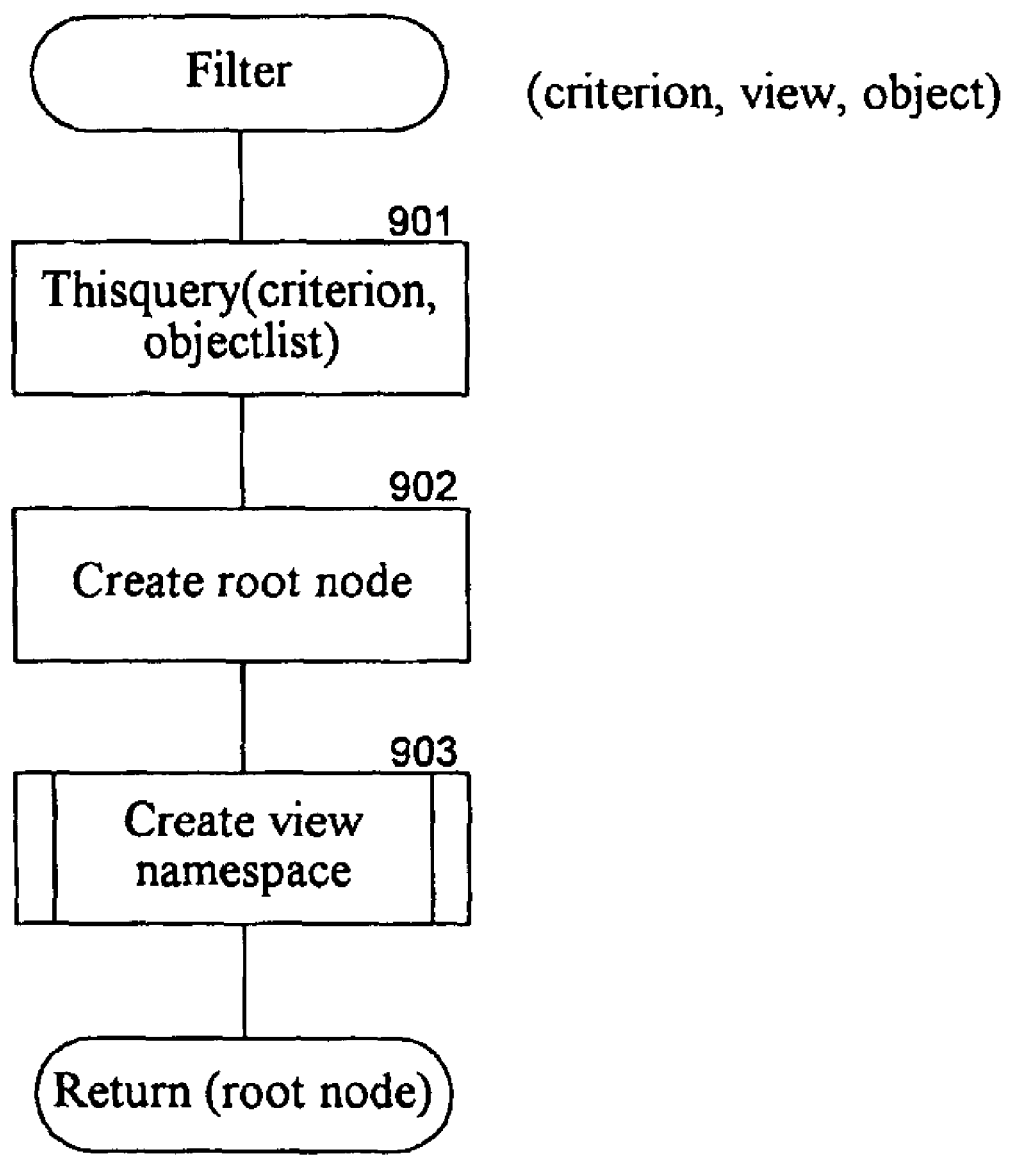
FIG. 9 is a flow diagram illustrating the processing of a filter method of the namespace in interface in one embodiment.

FIG. 9 is a flow diagram illustrating the processing of a filter method of the namespace in interface in one embodiment. The filter method is passed a query specification and a view specification and returns the root object of the view. In block 901, the method invokes the query method of this object passing the query specification and receiving an object list of the objects that match that query specification. In block 902, the method creates a root object for the view. In block 903, the method invokes the create view namespace function to create the view and then returns the root object of the view.

Figure 10:
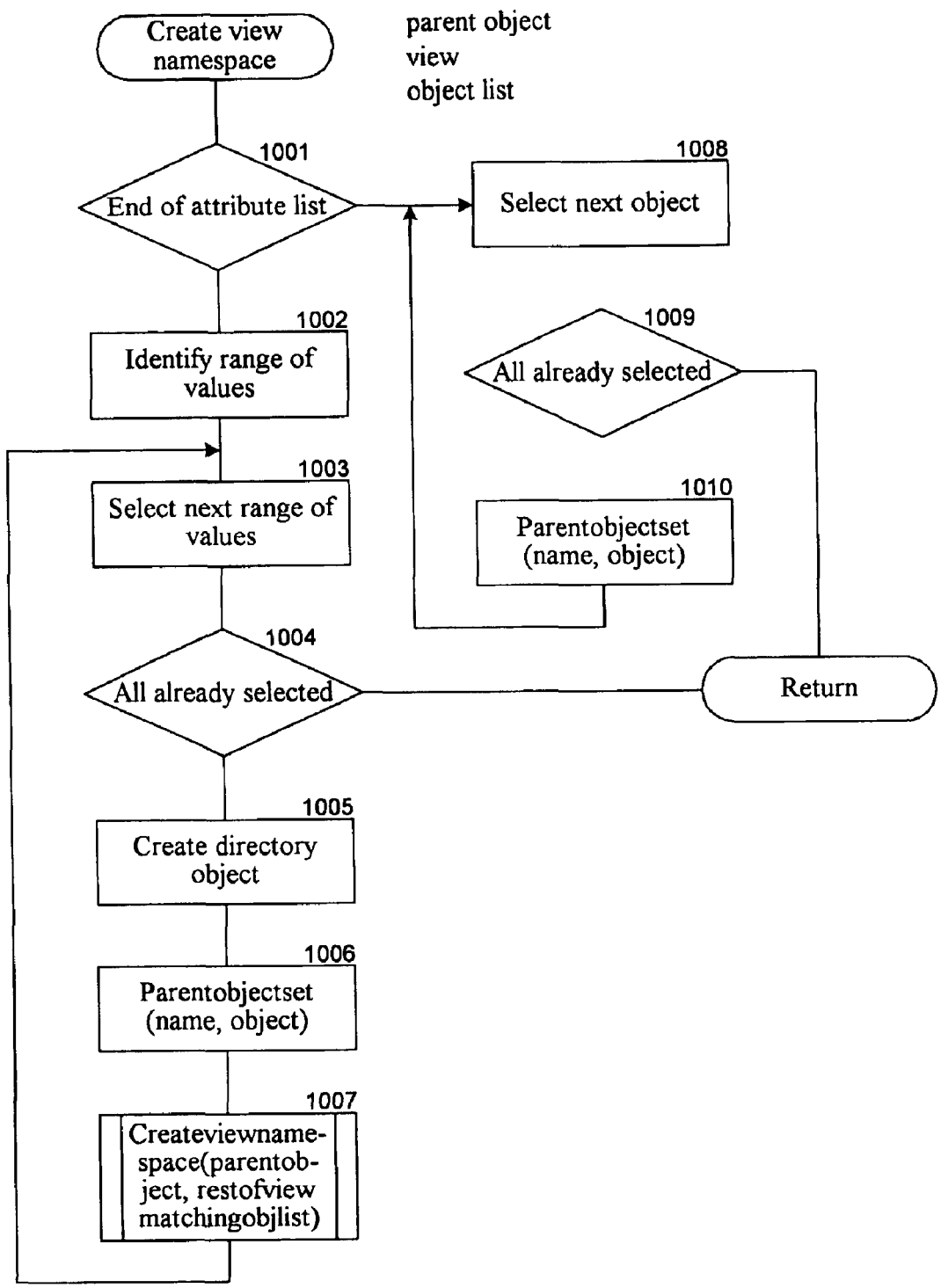
FIG. 10 is a flow diagram illustrating the process of the create view namespace function in one embodiment.

FIG. 10 is a flow diagram illustrating the processing of the create view namespace function in one embodiment. The function is passed a parent object for the namespace, a view specification, and an object list. The function creates a view namespace rooted at the parent object using the view specification and objects in the object list. In this example, the view specification is a simple path of attribute names that indicate the attributes for each level of the view namespace hierarchy. In decision block 1001, if all the attributes have already been processed, then the function is ready to add the objects of the object list to the view namespace as child objects of the parent object and continues at block 1008, else the function continues at block and 1002. In block 1002, the function identifies the range of values for the next attribute in the view specification. For example, the range of values for the kids attribute of FIG. 8 are "Ben" and "Scott." In blocks 1003-1007, the function loops creating directory objects for the ranges and creating the view namespaces for those objects. In block 1003, the function selects the next range of values. In decision block 1004, if all the ranges of values have already been selected, then the function returns, else the function continues at block 1005. In block 1005, the function creates a directory object for the selected range of values. In block 1006, the function invokes the set method of the parent object passing the created directory object along with the name representing the selected range of values. In block 1007, the function recursively invokes the create view namespace function passing the directory object as the parent object, the remainder of the view specification, and a list of objects that match the selected range. The function then loops to block 1003 to select the next range of values. In block 1008, the function selects the next object in the object list. In decision block 1009, if all the objects have already been selected, then the function returns, else the function continues at block 1010. In block 1010, the function invokes the set method of the parent object passing the name for the selected object along with a reference to the selected object and then loops to block 1008 to select the next object of the object list.

Figure 11:
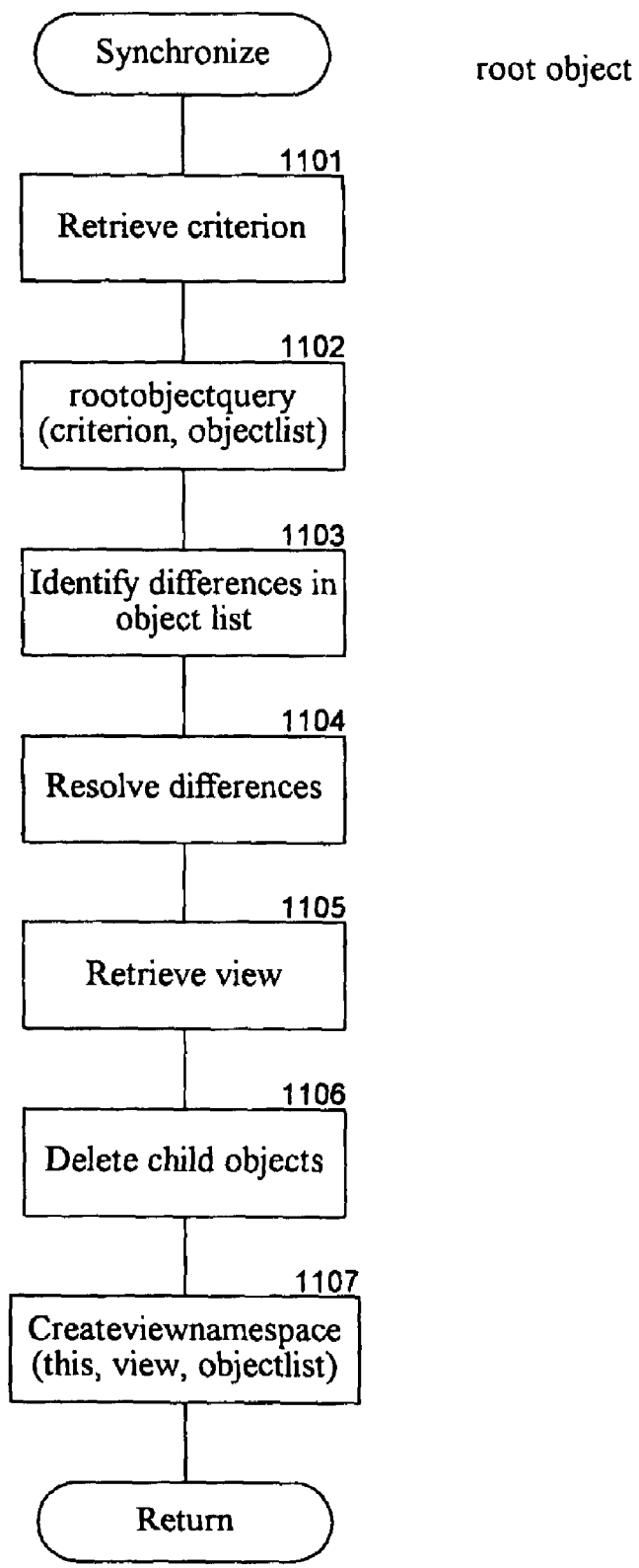
FIG. 11 is a block diagram illustrating the synchronization of a duplicate namespace with its original namespace in one embodiment.

FIG. 11 is a block diagram illustrating the synchronization of a duplicate namespace with its original namespace in one embodiment. The synchronize method may be a method of the namespace interface or may be a method provided by a synchronization interface of the root object of the duplicate namespace object. The method is passed the original namespace. In block 1101, the method retrieves the view specification for this duplicate namespace. In block 1102, the method invokes the query method of the root object of the original namespace passing the query specification and receiving a list of objects that match that query specification in return. In block 1103, the method identifies the differences in the objects of the returned object list and the objects of the duplicate namespace. One skilled in the art will appreciate that standard diff algorithms can be used to identify the differences. In block 1104, the method resolves the differences in the object list. The resolution depends on how the duplicate namespace is to be synchronized with the original namespace. If the duplicate namespace is a read-only copy of the original namespace, then any changes made to the original namespace need to be reflected in the duplicate namespace. These changes can be reflected by regenerating the duplicate namespace or simply making changes to the duplicate namespace to reflect the differences. In block 1105, the method retrieves the view for this duplicate namespace. In block 1106, the method deletes child objects of this root object to initialize the duplicate namespace. In block 1106, the method invokes the create view namespace function passing this object as the root object, the view specification, and the object list. That function creates the namespace under this object. The method then returns.

Figure 12:
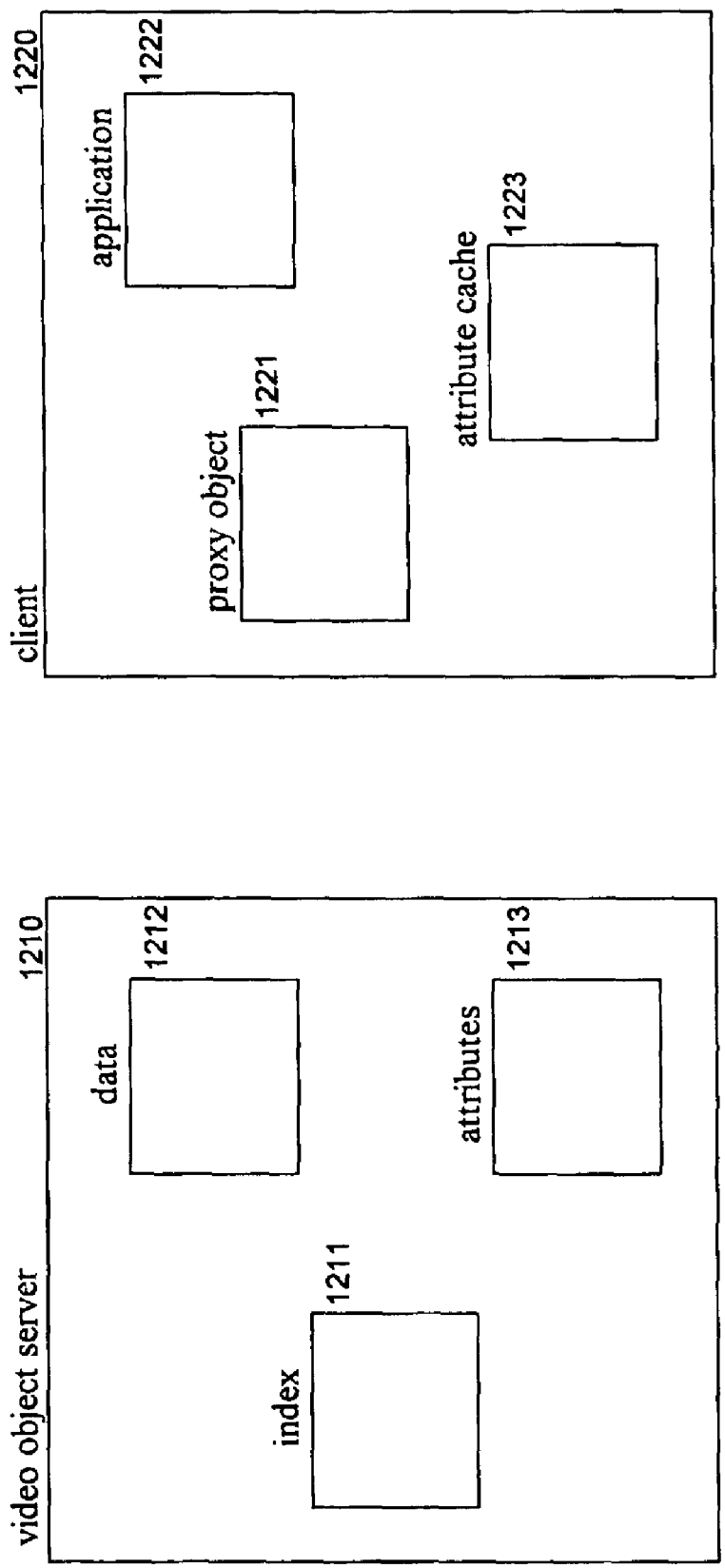
FIG. 12 is a block diagram illustrating the caching of attributes or other metadata in one embodiment.

FIG. 12 is a block diagram illustrating the caching of attributes or other metadata in one embodiment. Computer system 1210 is an object server, such as a video server, that contains data objects of the namespace. The data objects may be physically stored using index 1211, data table 1212, and attribute table 1213. Client computer system 1220 has application program 1212 that accesses the objects of the object server. The application accesses the objects via proxy object 1221, which is an implementation of the namespace interface. When a method of the proxy object is invoked, the method marshals the parameters and forwards them to the object server. The object server performs the function of the method and then returns any parameters to the proxy object, which are then returned to the application program. The proxy object in one embodiment retrieves attributes associated with the data objects and stores them in cache 1223. When the application subsequently invokes a method of the proxy object that relies on attribute data (e.g., the get attribute method), the proxy object can retrieve the appropriate information from the attribute cache and return it directly to the application program without having to access the object server.

Figure 13:
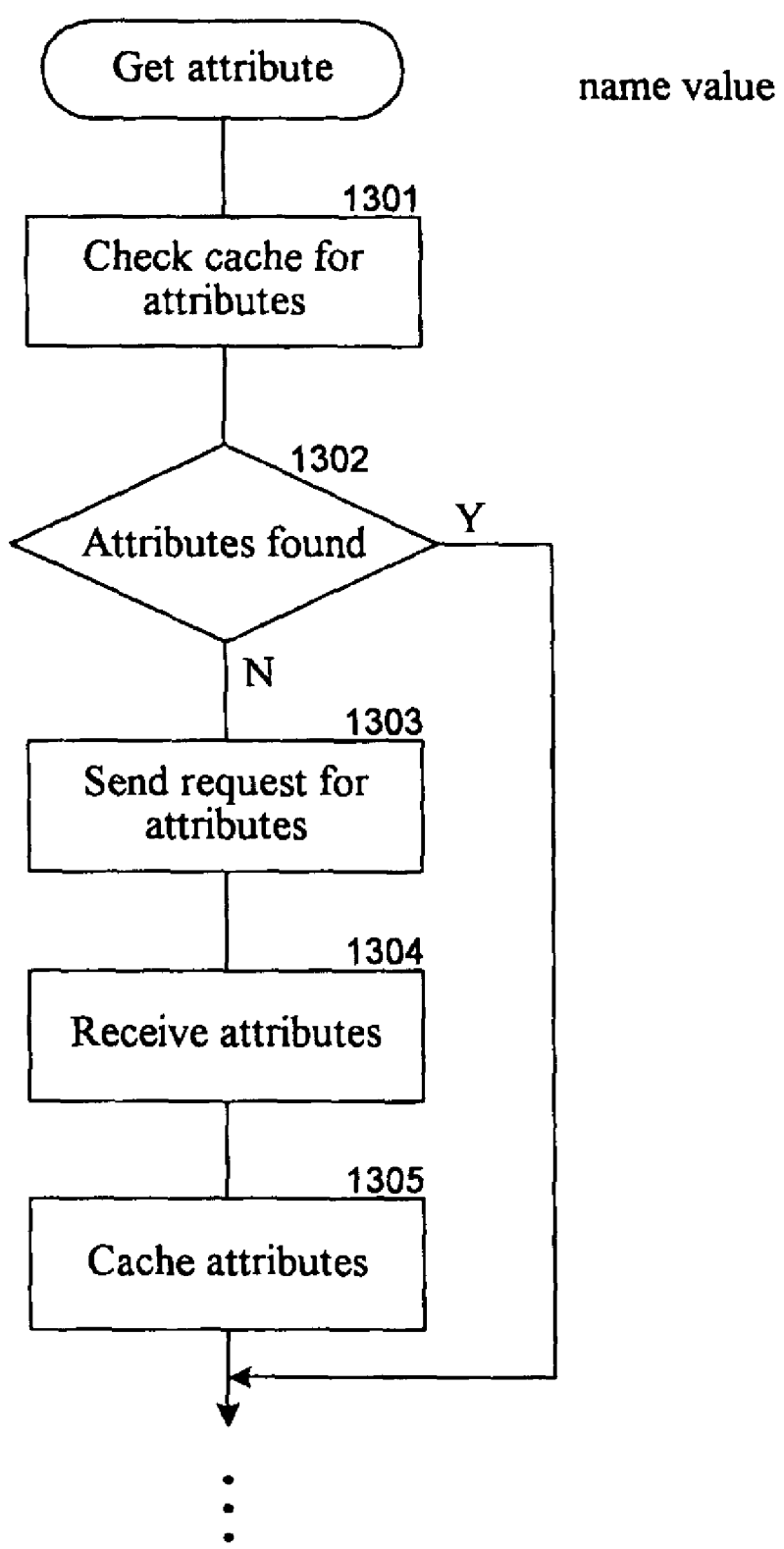
FIG. 13 is a flow diagram illustrating processing of the get attribute method of the proxy object in one embodiment.

FIG. 13 is a flow diagram illustrating processing of the get attribute method of the proxy object in one embodiment. The get attribute method is passed the name of the attribute and returns its value. In block 1301, the method checks the cache for an attribute of that name associated with this object. One skilled in the art will appreciate that there may be a proxy object for each object in the namespace. In decision block 1302, if the attributes are found for this object in the cache, then the method continues its normal processing to retrieve the attribute value, else the method continues at block 1303. In block 1303, the method sends a request to the object server for the attributes of this object. In block 1304, the method receives the attributes from the object server. In block 1305, the method caches the attributes and continues its normal processing to retrieve the attribute values indicated by the ellipses.

One skilled in the art will appreciate that although specific embodiments of the namespace system have been described herein for purposes of illustration, various modifications may be made without deviating from the spirit and scope of the invention. Accordingly, the invention is not limited except by the appended claims.

The embodiments of the invention in which an exclusive property or privilege is claimed are defined as follows:

1. A method in a computer system for synchronizing a duplicate namespace with an original namespace, the method comprising:
   receiving a query specification and a view specification for one or more objects in the namespace, the view specification indicating how objects satisfying the query specification are to be organized;
   identifying from the original namespace the objects that match the query specification;
   generating a duplicate namespace using the identified objects and the view specification;
   associating the query specification and view specification with the duplicate namespace;
   modifying one or more objects so that the original namespace and duplicate namespace are not synchronized;
   re-identifying from the original those objects that match the query specification; and
   modifying one or more objects so that the original namespace and duplicate namespace are synchronized.

2. The method of claim 1 wherein the modifying of the one or more objects so that namespaces are synchronized includes identifying differences between the re-identified objects and the objects of the duplicate namespace and reconciling those differences.

3. The method of claim 1 wherein the duplicate namespace is stored on a device that is only temporarily connected to the original namespace.

4. The method of claim 1 wherein the modifying of one or more objects so that the namespaces are not synchronized includes modifying an object of the duplicate namespace.

5. The method of claim 1 wherein the modifying of one or more objects so that the namespaces are not synchronized includes modifying an object of the original namespace.

* * * * *